US005919512A

United States Patent [19]
Montezinos

[11] Patent Number: 5,919,512
[45] Date of Patent: Jul. 6, 1999

[54] METHOD OF MAKING BEVERAGES HAVING STABLE FLAVOR/CLOUD EMULSIONS IN THE PRESENCE OF POLYPHOSPHATE-CONTAINING PRESERVATIVE SYSTEMS AND LOW LEVELS OF XANTHAN GUM

[75] Inventor: David Lee Montezinos, Fairfield, Ohio

[73] Assignee: The Procter & Gamble Company, Cincinnati, Ohio

[21] Appl. No.: 09/037,264

[22] Filed: Mar. 9, 1998

Related U.S. Application Data

[63] Continuation of application No. 08/853,820, May 9, 1997, Pat. No. 5,792,502, which is a continuation of application No. 08/572,977, Dec. 15, 1995, abandoned.

[51] Int. Cl.$^6$ ............................. A23L 1/054; A23L 2/00
[52] U.S. Cl. .................. 426/590; 426/573; 426/597; 426/599; 426/654
[58] Field of Search ..................... 426/590, 599, 426/597, 573, 654

[56] References Cited

U.S. PATENT DOCUMENTS

| | | | |
|---|---|---|---|
| 2,764,486 | 9/1956 | Stevens et al. | 99/78 |
| 3,404,987 | 10/1968 | Kooistra et al. | 99/150 |
| 3,668,132 | 6/1972 | Finder | 252/80 |
| 3,681,091 | 8/1972 | Kohl | 99/150 |
| 4,037,000 | 7/1977 | Burge et al. | 426/572 |
| 4,163,807 | 8/1979 | Jackman | 426/599 |
| 4,219,583 | 8/1980 | Igoe | 426/580 |
| 4,220,673 | 9/1980 | Strobel | 426/655 |
| 4,448,000 | 5/1984 | De Leon et al. | 426/599 |
| 4,529,613 | 7/1985 | Mezzino et al. | 426/590 |
| 4,705,691 | 11/1987 | Kupper et al. | 426/590 |
| 4,717,579 | 1/1988 | Vietti et al. | 426/597 |
| 4,746,528 | 5/1988 | Prest et al. | 426/573 |
| 4,748,033 | 5/1988 | Syfert et al. | 426/330.3 |
| 4,906,482 | 3/1990 | Zemel et al. | 426/74 |
| 4,938,983 | 7/1990 | Peignier et al. | 426/573 |
| 4,980,182 | 12/1990 | Kwon et al. | 426/130 |
| 5,021,251 | 6/1991 | McKenna et al. | 426/330.5 |
| 5,273,767 | 12/1993 | Burgum | 426/240 |
| 5,417,994 | 5/1995 | Chang et al. | 426/330.5 |
| 5,431,940 | 7/1995 | Calderas et al. | 426/330.3 |

FOREIGN PATENT DOCUMENTS

| | | |
|---|---|---|
| 93/08704 | 5/1993 | WIPO . |
| 96/00510 | 1/1996 | WIPO . |

OTHER PUBLICATIONS

Kang et al.; Xanthan, Gellan, Welan and Rhamsan; *Industrial Gums, Polysaccharides and Their Derivatives*; 3rd Edition; Harcourt Brace Jovanovich, Publishers; 1993; pp. 342–396.

Clare; Applications of novel biogums; *Chemicals*; Aug. 1989; pp. 238–244.

Patent Abstracts of Japan, vol. 012, No. 312 (C–523) Aug. 24, 1988 and JP 63 084465 A.

Chemical Abstracts; M. Kagaku et al.; vol. 95, No. 21, Nov. 23, 1981; p. 523.

V.J. Morris; Biotechnically Produced Carbohydrates with Functional Properties for Use In Food Systems *Food Technology*, 4(1) (1990) pp. 45–57.

Rengaswami Chandrasekaran, et al; The Crystal Structure of Gellan *Carbohydrate Research*, 175 (1988)) pp. 1–15.

I.W. Sutherland; The Role of Acylation in Exopolysaccharides Including Those for Food Use *Food Biotechnology* 6(1), (1992) pp. 75–86.

*Primary Examiner*—Helen Pratt
*Attorney, Agent, or Firm*—Gerry S. Gressel; Karen F. Clark; Jacobus C. Rasser

[57] ABSTRACT

A beverage such as a dilute juice or tea beverage having a stable flavor/cloud emulsion that contains from about 0.005 to about 0.015% xanthan gum, from about 100 ppm to about 1000 ppm of a preservative which can be sorbic acid, benzoic acid and, alkali metal salts thereof and mixtures thereof, from about 300 ppm to about 3000 ppm of a food grade water soluble polyphosphate, and from about 60 to about 99% by weight of added water having from 0 ppm to about 180 ppm of hardness.

15 Claims, No Drawings

METHOD OF MAKING BEVERAGES HAVING STABLE FLAVOR/CLOUD EMULSIONS IN THE PRESENCE OF POLYPHOSPHATE-CONTAINING PRESERVATIVE SYSTEMS AND LOW LEVELS OF XANTHAN GUM

This is a continuation of application Ser. No. 08/853,820, filed on May 9, 1997, now U.S. Pat. No. 5,792,502, which is a continuation of application Ser. No. 08/572,977, filed on Dec. 15, 1995 now abandoned.

TECHNICAL FIELD

This application relates to beverages, especially dilute juice and tea beverages, that have stable flavor emulsions and/or cloud emulsions. This application especially relates to beverages that have stable flavor emulsions and/or cloud emulsions in the presence of polyphosphate-containing preservative systems.

BACKGROUND OF THE INVENTION

Dilute juice beverage products having cloudy or opaque appearance are well known in the art. The cloudy or opaque appearance of these dilute juice products is typically achieved by incorporating a beverage emulsion. Beverage emulsions can be either flavor emulsions (i.e., provide the beverage with flavor and cloudiness) or cloud emulsions (i.e., provide primarily cloudiness). Both types of beverage emulsions comprise an oil phase that is dispersed in a continuous water phase, i.e., they are "oil-in-water" emulsions. This oil phase is typically uniformly dispersed in the continuous water phase in the form of fine droplets that give the beverage its cloudy or opaque appearance.

Beverage emulsions are thermodynamically unstable systems that have a tendency to revert to their original state of two immiscible liquids (i.e., a two phase system). Since the oil is the dispersed phase, it exists as droplets that tend to separate, or "flocculate" by aggregating to form clumps. In the absence of weighting agents, the oil phase, being lighter than the water phase, can separate and rise to the top of the beverage container. This phenomenon is usually referred to as "creaming" and can manifest itself as an unsightly ring inside the neck of the bottle (a condition commonly referred to as "ringing") or as powdery "floc" on the shoulder of the bottle. Conversely, the oil phase can become attached to colloidal particles heavier than the water phase, in which case the oil phase will settle to the bottom of the container. This condition is usually referred to as "sedimentation" because the cloud appears as sediment on the bottom of the bottle.

To enhance the stability of these flavor/cloud emulsions, a thickener or blend of thickeners can be added to the dilute juice beverage. These include propylene glycol alginate, xanthan gum, pectin, starch, modified starch, gellan gum, and carboxymethylcellulose. See U.S. Pat. No. 5,376,396 (Clark), issued Dec. 27, 1994 (beverage stabilizing systems formed from a blend of gellan gum and carboxymethylcellulose that preferably includes propylene glycol alginate); U.S. Pat. No. 4,163,807 (Jackman), issued Aug. 7, 1979 (citrus fruit product containing fruit pulp that consists of citrus fruit juice or a fruit drink containing citrus fruit juice and a combination of gums consisting essentially of xanthan gum and sodium carboxymethyl cellulose). These thickeners essentially stabilize the flavor/cloud emulsion by increasing the relative viscosity of the dilute juice beverage. However, while stabilizing the flavor/cloud emulsion, these thickeners can also undesirably affect the beverage flavor and feel, especially if relatively large quantities of these thickeners are required. In this regard, xanthan gum is preferred because it imparts a relatively high viscosity at near-zero shear, which is typical during beverage storage, but shear thins dramatically to provide an appropriate thickness character when a beverage is consumed. Unfortunately, when included in the dilute juice beverage at higher levels, some thickeners, especially xanthan gum, can potentially destabilize the flavor/cloud emulsion.

The ability to stabilize flavor/cloud emulsions in dilute juice products can be further complicated by other beverage components typically present in the product. One such component that is desirably present in dilute juice beverages that are intended to be stored without refrigeration (e.g., at ambient temperatures) is an antimicrobial preservative. Dilute juice beverages, when exposed to food spoilage microorganisms, can provide a hospitable environment for rapid microbial growth. Such exposure can, and infrequently does, result from accidental inoculation of the dilute juice beverage during manufacturing or packaging. Food spoilage microorganisms can then rapidly proliferate by feeding on nutrients provided by the juice component of the dilute juice beverage.

Preservatives, such as sorbates, benzoates, organic acids, and combinations thereof have been used in dilute juice beverages to provide some degree of microbial inhibition. At levels effective to inhibit microbial growth, some of these preservatives can contribute off-flavors to dilute juice beverages. Accordingly, it has been recently suggested to use certain food grade polyphosphates (especially sodium hexametaphosphate) to enhance the potency of these preservatives at lower levels in dilute juice beverages. See U.S. Pat. No. 5,431,940 (Calderas), issued Jul. 11, 1995, which discloses the use of antimicrobial polyphosphates, such as sodium hexametaphosphate, with sorbate preservatives, such as potassium sorbate, in dilute juice beverages having relatively low water hardness.

However, it has been found that the presence of polyphosphates, especially sodium hexametaphosphate, in combination with xanthan gum, can have a destabilizing effect on flavor/cloud emulsions used in dilute juice beverages. While not being bound by theory, it is believed that polymeric materials, including sodium hexametaphosphate and xanthan gum, exist in a well-hydrated colloid-like state (i.e., each polymer is a separate phase) when mixed with sufficient water. Depending on the concentration of the polymeric material and its compatibility with other components in the beverage, each of these colloidal particles has its own unique tendency to phase separate and aggregate into clumps that exclude the droplets of the oil phase from part of the aqueous continuous phase. As the oil droplets are crowded into the remaining available space, the rate at which they, in turn, aggregate and begin to flocculate increases rapidly, causing ring and floc to occur much sooner than would otherwise be the case.

Accordingly, it would be desirable to be able to formulate dilute juice beverages that: (1) have stable flavor/cloud emulsions; (2) can be stored at ambient temperatures through the use of preservative systems that contain polyphosphates, especially sodium hexametaphosphate; (3) have desirable mouthfeel; and (4) do not have undesired flavor effects.

DISCLOSURE OF THE INVENTION

The present invention relates to beverage products, especially dilute juice and tea beverage products, that have stable flavor emulsions and/or cloud emulsions. These beverage products comprise:

(a) from about 0.2 to about 5% of an oil-in-water beverage emulsion selected from flavor emulsions and cloud emulsions;

(b) from 0 to about 40% flavor solids selected from fruit juice, tea solids and mixtures thereof;

(c) from about 0.005 to about 0.015% xanthan gum;

(d) from about 100 ppm to about 1000 ppm of a preservative selected from sorbic acid, benzoic acid, alkali metal salts thereof and mixtures thereof;

(e) an amount of a water soluble polyphosphate effective to enhance the antimicrobial potency of the preservative;

(f) from about 60 to about 99% by weight of added water having from 0 ppm to about 180 ppm of hardness.

It has been found that xanthan gum alone, at these relatively low levels, is effective in providing unique viscosity properties without destabilizing flavor or cloud emulsions in beverages that additionally contain polyphosphates. Other beverage stabilizers such as carboxymethylcellulose can be included along with xanthan gum to positively impact viscosity and mouthfeel without destabilizing the emulsions. Even without these other beverage stabilizers, low levels of xanthan gum impart a relatively high viscosity at near zero shear, yet thin dramatically under shear to provide an appropriate thickness character to the beverage when consumed. Moreover, because it is included at relatively low levels in the beverage, the xanthan gum does not adversely interact with the polyphosphates that are included to enhance the potency of the preservatives, such as potassium sorbate.

DETAILED DESCRIPTION OF THE INVENTION

A. Definitions

As used herein, "microbial proliferation" means a 100 fold increase or greater in the number of beverage spoilage microorganisms in a beverage after an initial contamination level of about 10 cfu/ml.

As used herein, "ambient display time" means the period of time during which a beverage product at 68° F. (20° C.) can effectively resist microbial proliferation following a 10 cfu/ml contamination with beverage spoilage microorganisms.

As used herein, the term "comprising" means various components can be conjointly employed in the preparation of the beverages of the present invention.

As used herein "noncarbonated beverages" means beverages that contain less than one volume of carbonation.

All weights, parts and percentages used herein are based on weight unless otherwise specified.

B. Beverage Emulsions

The beverages of the present invention comprise from about 0.2 to about 5%, preferably from about 0.5 to about 3%, most preferably from about 0.8 to about 2%, of a beverage emulsion. This beverage emulsion can be either a cloud emulsion or a flavor emulsion.

For cloud emulsions, the clouding agent can comprise one or more fats or oils stabilized as an oil-in-water emulsion using a suitable food grade emulsifier. Any of a variety of fats or oils can be employed as the clouding agent, provided that the fat or oil is suitable for use in foods and beverages. Preferred are those fats and oils that have been refined, bleached and deodorized to remove off-flavors. Especially suitable for use as clouding agents are those fats that are organoleptically neutral. These include fats from the following sources: vegetable fats such as soybean, corn, safflower, sunflower, cottonseed, canola, and rapeseed; nut fats such as coconut, palm, and palm kernel; and synthetic fats. See U.S. Pat. No. 4,705,691 (Kupper, et al), issued Nov. 10, 1987 (herein incorporated by reference) for suitable fat or oil clouding agents.

Any suitable food grade emulsifier can be used that can stabilize the fat or oil clouding agent as an oil-in-water emulsion. Suitable emulsifiers include gum acacia, modified food starches (e.g., alkenylsuccinate modified food starches), anionic polymers derived from cellulose (e.g., carboxymethylcellulose), gum ghatti, modified gum ghatti, xanthan gum, tragacanth gum, guar gum, locust bean gum, pectin, and mixtures thereof. See U.S. Pat. No. 4,705,691 (Kupper, et al), issued Nov. 10, 1987, which is incorporated by reference. Modified starches treated so they contain hydrophobic as well as hydrophilic groups, such as those described in U.S. Pat. No. 2,661,349 (Caldwell et al) (herein incorporated by reference), are preferred emulsifiers for use as herein. Octenyl succinate (OCS) modified starches such as those described in U.S. Pat. No. 3,455,838 (Marotta et al.), and U.S. Pat. No. 4,460,617 (Barndt et al.), (herein incorporated by reference), are especially preferred emulsifiers.

The clouding agent can be combined with a weighting agent to provide a beverage opacifier that imparts a total or partial opaque effect to the beverage without separating out and rising to the top. The beverage opacifier provides the appearance to the consumer of a juice-containing beverage. Any suitable weighting oil can be employed in the beverage opacifier. Typical weighting oils include brominated vegetable oil, glycerol ester of wood rosin (ester gum), sucrose acetate isobutyrate (SAIB) and other sucrose esters, gum damar, colophony, gum elemi, or others known to those skilled in the art. Other suitable weighting agents include brominated liquid polyol polyesters that are nondigestible. See U.S. Pat. No. 4,705,690 (Brand et al), issued Nov. 10, 1987, which is incorporated by reference.

The cloud/opacifier emulsion is prepared by mixing the clouding agent with the weighting agent (for opacifier emulsions), the emulsifier and water. The emulsion typically contains from about 0.1 to about 25% clouding agent, from about I to about 20% weighting oil agent (in the case of opacifier emulsions), from about I to about 30% emulsifiers, and from about 25 to about 97.9% water, quantum satis.

The particle size of the water-insoluble components of the emulsion is reduced by employing a suitable apparatus known in the art. Because the ability of emulsifying agents to hold oil in suspension is proportional to particle size, emulsions of particles with diameters of about 0.1 to about 3.0 are suitable. Preferably, the particles are about 2.0 microns or less in diameter. Most preferred is an emulsion in which substantially all the particles are 1.0 microns or less in diameter. The particle size is reduced by passing the mixture through an homogenizer, colloid mill or turbine-type agitator. Usually one or two passes is sufficient. See U.S. Pat. No. 4,705,691 (Kupper, et al), issued Nov. 10, 1987, which is incorporated by reference.

Flavor emulsions useful in the beverages comprise one or more suitable flavor oils, extracts, oleoresins, essential oils and the like, known in the art for use as flavorants in beverages. This component can also comprise flavor concentrates such as those derived from concentration of natural products such as fruits. Terpeneless citrus coils and essences can also be used herein. Examples of suitable flavors include fruit flavors such as orange, lemon, lime and the like, cola flavors, tea flavors, coffee flavors, chocolate flavors, dairy flavors, and others. These flavors can be derived from natural sources such as essential oils and extracts, or can be synthetically prepared. The flavor emulsion typically comprises a blend of various flavors and can be employed in the form of an emulsion, alcoholic extract, or spray dried. The flavor emulsion can also include clouding agents, with or without weighting agents, as previously described. See U.S. Pat. No. 4,705,791 (Kupper, et al), issued Nov. 10, 1987, which is incorporated by reference.

Flavor emulsions are typically prepared in the same manner as cloud/pacifier emulsions by mixing flavoring oils (0.001 to 20%) with an emulsifying agent (1 to 30%) and water. (The oil clouding agents can also be present.) Emulsions of particles with diameters of from about 0.1 to about 3.0 microns are suitable. Preferably, the particles are about 2.0 microns or less in diameter. Most preferably, the particles are about 1.0 microns or less in diameter. The emulsifying agent coats the particularized flavor oil to aid in preventing coalescence and in maintaining an apprpriate dispersion. The viscosity and specific gravity of the flavor emulsion are regulated to be compatible with the finished beverage. See U.S. Pat. No. 4,705,691 (Kupper, et al), issued Nov. 10, 1987, which is incorporated by reference.

C. Fruit Juice and Tea Solids

The dilute juice beverages of the present invention optionally but preferably comprise flavor solids selected from fruit juice, tea solids and mixtures of fruit juice and tea solids. When fruit juice is included, the beverages of the present invention can comprise from 0.1 to about 40%, preferably from 1 to about 20%, more preferably from about 2 to about 10%, most preferably from about 3 to about 6%, fruit juice. (As measured herein, the weight percentage of fruit juice is based on a single strength 2° to 16° Brix fruit juice.) The fruit juice can be incorporated into the beverage as a puree, comminute or as a single strength or concentrated juice. Especially preferred is the incorporation of the fruit juice as a concentrate with a solids content (primarily as sugar solids) of from about 20° to about 80° Brix.

The fruit juice can be any citrus juice, non-citrus juice, or mixture thereof, which are known for use in dilute juice beverages. Examples of such fruit juices include, but are not limited to, non-citrus juices such as apple juice, grape juice, pear juice, nectarine juice, currant juice, raspberry juice, gooseberry juice, blackberry juice, blueberry juice, strawberry juice, custard-apple juice, pomegranate juice, guava juice, kiwi juice, mango juice, papaya juice, watermelon juice, cantaloupe juice, cherry juice, cranberry juice, pineapple juice, peach juice, apricot juice, plum juice and mixtures thereof, and citrus juices such as orange juice, lemon juice, lime juice, grapefruit juice, tangerine juice and mixtures thereof. Other fruit juices, and nonfruit juices such as vegetable or botanical juices, can be used as the juice component of the noncarbonated beverage products of the present invention.

When tea solids are included, the beverages of the present invention can comprise from about 0.02 to about 0.25%, preferably from about 0.7 to about 0.15%, by weight of tea solids. The term "tea solids" as used herein means solids extracted from tea materials including those materials obtained from the genus Camellia including *C. sinensis* and *C. assaimica,* for instance, freshly gathered tea leaves, fresh green tea leaves that are dried immediately after gathering, fresh green tea leaves that have been heat treated before drying to inactivate any enzymes present, unfermented tea, instant green tea and partially fermented tea leaves. Green tea materials are tea leaves, tea plant stems and other plant materials that are related and which have not undergone substantial fermentation to create black teas. Members of the genus Phyllanthus, *catechu gambir* and Uncaria family of tea plants can also be used. Mixtures of unfermented and partially fermented teas can be used.

Tea solids for use in beverages of the present invention can be obtained by known and conventional tea solid extraction methods. Tea solids so obtained will typically comprise caffeine, theobromine, proteins, amino acids, minerals and carbohydrates. Suitable beverages containing tea solids can be formulated according to U.S. Pat. No. 4,946,701 (Tsai et al), issued Aug. 7, 1990, which is incorporated by reference.

D. Xanthan Gum and Other Thickeners

The beverages of the present invention comprise xanthan gum as a primary thickener and emulsion stabilizer. Xanthan gum is an exocellular heteropolysaccharide polymer produced by a fermentation process that uses the bacteria *Xanthomonas campestris*. This polymer has five sugar residues (two glucose units, two mannose units, and one glucuronic acid) with a backbone of 1,4 linked beta-D-glucose units that is identical in structure to cellulose. The xanthan molecule is highly elastic and provides highly pseudoplastic aqueous solutions. Under increasing shear, the viscosity is progressively reduced, but when the shear is removed, the viscosity recovers almost instantaneously.

Prior to the present invention, xanthan gum was typically used at a level of from about 0.1 about 0.3% in beverages to stabilize flavor/cloud emulsions. See U.S. Pat. No. 5,385,748 (Bunger et al), Jan. 31, 1995. However, the inclusion of xanthan gum at these levels has been found to cause an adverse interaction with polyphosphates that are also included in the beverages of the present invention. Indeed, when included at levels in excess of 0.1%, xanthan gum interacts so badly with these polyphosphates as to cause emulsion instability and flocculation. This is especially true of sodium hexametaphosphate, the preferred polyphosphate for use in the beverages of the present invention.

Accordingly, xanthan gum is included in the beverages of the present invention at level low enough to avoid adverse interactions with the polyphosphates (e.g., sodium hexametaphosphate), yet at a level high enough to: (1) stabilize the flavor/cloud emulsion; and (2) impart other desirable viscosity effects to the beverage. Beverages according to the present invention comprise from about 0.005 to about 0.015, preferably from about 0.005 to about 0.01%, xanthan gum. At these relatively low levels, it is believed that xanthan gum is sufficiently dilute not to tend to phase separate, even in the presence of polyphosphates. However, it still has significant viscosity in a resting solution, and can, therefore, contribute to the stabilization of a flavor/cloud emulsion.

The beverages of the present invention can comprise other thickeners in addition to xanthan gum. These other thickeners include carboxymethylcellulose, propylene glycol alginate, gellan gum, guar gum, pectin, tragacanth gum, gum acacia, locust bean gum, gum arabic, gelatin, as well as mixtures of these thickeners. (As noted above, many of these optional thickeners can also function as emulsifiers for stabilizing the fat/oil clouding agent in the beverage emulsion.) These other thickeners can be included in the beverages of the present invention at levels typically up to about 0.07%, depending on the particular thickener involved and the viscosity effects desired.

E. Polyphosphate-Containing Preservative System

An important aspect of the present invention is to stabilize the beverage emulsion during ambient storage and until the beverage is consumed. However, components in the beverage, such as fruit juice or tea solids, can provide a hospitable environment for rapid microbial growth, especially when stored at ambient temperatures. This necessitates the inclusion of a preservative system to prevent or retard such microbial growth.

Accordingly, the beverages of the present invention comprise from about 100 to about 1000 ppm, preferably from about 200 to about 1000 ppm, and most preferably from about 200 ppm to about 750 ppm, of a preservative selected from sorbic acid, benzoic acid, alkali metal salts thereof and mixtures thereof. The preservative is preferably selected from sorbic acid, potassium sorbate, sodium sorbate and mixtures thereof. Most preferred is potassium sorbate.

The beverages of the present invention further comprise an amount of a food grade water soluble polyphosphate that is effective to enhance the antimicrobial potency of the preservative. What constitutes an "effective amount" of the polyphosphate to enhance the antimicrobial potency of the preservative will depend on a number of factors, including the specific preservative used, the level at which the preservative is present in the beverage, the pH of the beverage, and the level of hardness present in the beverage. It is believed that the polyphosphate enhances the antimicrobial potency of the preservative by sequestering the hardness (i.e., calcium and magnesium ions) present in the beverage. This causes the microbes present in the beverage to lose calcium and magnesium and thus interferes with their ability to protect themselves from the antimicrobial effect of the preservative. Inclusion of the polyphosphate in beverage at levels of from about 300 to about 3000 ppm, preferably from about 900 to about 3000 ppm, more preferably from about 1000 ppm to about 1500 ppm, has been found to be effective in enhancing the antimicrobial potency of the preservative.

Suitable food grade water soluble polyphosphates for use in the beverages of the present invention typically have the following general formula:

$$(MPO_3)_n$$

where n averages from about 3 to about 100 and each M is independently selected from sodium and potassium atoms, i.e., are alkali metal salts of the polyphosphates. Preferably, n averages from about 13 to about 30 and each M is a sodium atom. Especially preferred are straight chain sodium polyphosphates (i.e., each M is a sodium atom) where n averages from about 13 to about 21, e.g., sodium hexametaphosphate.

The selected preservatives and polyphosphates act synergistically, or at least additively, to inhibit microbiological growth in the beverages of the present invention. This combination is particularly effective in inhibiting yeast, including preservative resistant *Zygosaccharomyces bailii*, and acid tolerant preservative resistant bacteria. Even within the juice concentrations specified for beverages of the present invention (i.e., about 0.1 to about 40%), ambient display times will increase with decreased percentages of juice in the beverage, such that low juice concentrations correlate with ambient display times exceeding about 20 days, while higher juice concentrations tend to correlate with ambient display times of between about 10 and 20 days. Variations in the concentration of preservatives and polyphosphates within the ranges described herein can also impact ambient display times. Nonetheless, so long as the concentration of juice, preservative, polyphosphate, and water hardness (and preferably water alkalinity) are within the ranges recited herein for the beverages, ambient display times will be at least about 10 days.

F. Hardness and Alkalinity

The beverages of the present invention also include water having a relatively low hardness, and preferably of controlled alkalinity. Specifically, the beverages of the present invention comprise from about 60 to about 99% additional water, more typically from about 80 to about 93% water. It is primarily the hardness of this water component that, when used in conjunction with the preservative system described above, provides a greatly improved antimicrobial effect. In addition to hardness, controlling the alkalinity of the added water can provide some improvement in the antimicrobial benefit.

The term "hardness" as used herein refers to the presence of calcium and magnesium cations in water, generally. For purposes of the present invention, hardness of the added water component is calculated according to Association of Official Analytical Chemists (AOAC) standards set forth in *Official Methods of Analysis,* published by the AOAC, Arlington, Va., pp 627–628 (14th ed. 1984), which is incorporated herein by reference. Under AOAC standards, hardness is the sum of $CaCO_3$ equivalents (mg/L) in water, which sum is obtained by multiplying the concentrations (mg/L) found of the following cations in the water by the factors.

TABLE 1

| Cation | Factor |
|---|---|
| Ca | 2.497 |
| Mg | 4.116 |
| Sr | 1.142 |
| Fe | 1.792 |
| Al | 5.564 |
| Zn | 1.531 |
| Mn | 1.822 |

Compounds that impart hardness to water are primarily magnesium and calcium carbonates, bicarbonates, sulfates, chlorides and nitrates, although other compounds that can contribute polyvalent cations to water can also impart hardness. Water based on hardness is normally classified as soft (0–60 ppm), moderately hard (61–120 ppm), hard (121–180 ppm) and very hard (over 180 ppm).

The term "alkalinity" as used herein refers to the presence of carbonate and bicarbonate anions in water, generally. For purposes of the present invention, alkalinity of the added water component is measured according to AOAC standards set forth in *Official Methods of Analysis,* published by the AOAC, Arlington, Va. pp 618–619 (14th ed. 1984), which is incorporated herein by reference. The standard AOAC Titrimetric Method for measuring hardness can involve automatic titrators and pH meters, suitably calibrated, or visual titration. Alkalinity is then calculated and expressed as $CaCO_3$ (mg/L) equivalents in the added water component. Compounds that impart alkalinity to water include carbonate, bicarbonate, phosphate, hydroxide and silicate salts of potassium, sodium, calcium and magnesium.

For purposes of the present invention, added water does not include water incidentally included in the beverage by other added materials such as, for example, the fruit juice component. This added water comprises from 0 to about 180 ppm, preferably from 0 ppm to about 60 ppm, and most preferably from 0 to about 30 ppm, of hardness. Excessively hard water can be treated or softened by known and conventional methods to reduce hardness levels to appropriate levels. This treated water can then be used as the added water. A suitable method for softening the added water involves treating the water with $Ca(OH)_2$. This well-known method is most suitable and economical for water having an initial hardness of 100–150 ppm as calcium carbonate. This softening method is not efficient with raw waters with less than about 100 ppm of hardness.

Another suitable method for softening the added water involves ion-exchange operations. This well known method can be used to treat water having an initial hardness of 50–100 ppm. Such ion-exchange operations are in wide application both for the home and industry. Other methods for controlling hardness of the added water can also be used.

The added water preferably comprises from 0 to about 300 ppm, more preferably from 0 ppm to about 60 ppm, of alkalinity. Alkalinity can be adjusted to the preferred level by known or conventional water treatment methods. Suitable methods for adjusting hardness and alkalinity of the added water component are described, for example, by Woodroof and Phillips, Beverages: *Carbonated & Noncarbonated*, AVI Publishing Co., pp 132–151 (rev. ed. 1981), and also by Thorner and Herzberg, *Non-alcoholic Food Service Beverage Handbook*, AVI Publishing Co., pp 229–249 (2nd ed. 1978), both descriptions being incorporated herein by reference.

It is important that the hardness, and preferably the alkalinity, of the added water be within the ranges described above. It has been found that the preservative system described above does not, by itself, sufficiently inhibit the subsequent proliferation of yeast and acid tolerant preservative resistant bacteria. However, this same preservative system, when combined with the above recited water quality controls, will inhibit this subsequent microbial proliferation in beverages for up to at least 10 days, typically for at least about 20 days.

G. Acidity

The beverages of the present invention typically have a pH of from about 2.5 to about 4.5, preferably from about 2.7 to about 3.5. This pH range is typical for noncarbonated beverages. Beverage acidity can be adjusted to and maintained within the requisite range by known and conventional methods, e.g., the use of food grade acid buffers. Typically, beverage acidity within the above recited ranges is a balance between maximum acidity for microbial inhibition and optimum acidity for the desired beverage flavor and sourness impression.

H. Sweetener

The beverages of the present invention can, and typically will, contain a sweetener, preferably carbohydrate sweeteners, more preferably mono- and or di-saccharide sugars. Specifically, these beverages will typically comprise from about 0.1 to about 20%, more preferably from about 6 to about 14%, sugar solids. Suitable sweetener sugars include maltose, sucrose, glucose, fructose, invert sugars and mixtures thereof. These sugars can be incorporated into the beverages in solid or liquid form but are typically, and preferably, incorporated as a syrup, more preferably as a concentrated syrup such as high fructose corn syrup. For purposes of preparing beverages of the present invention, these optional sweeteners can be provided to some extent by other components of the beverage such as the fruit juice component, flavorants, and so forth.

Preferred carbohydrate sweeteners for use in these beverages are sucrose, fructose, glucose, and mixtures thereof. Fructose can be obtained or provided as liquid fructose, high fructose corn syrup, dry fructose or fructose syrup, but is preferably provided as high fructose corn syrup. High fructose corn syrup (HFCS) is commercially available as HFCS-42, HFCS-55 and HFCS-90, which comprise 42%, 55% and 90%, respectively, by weight of the sugar solids therein as fructose.

Artificial or noncaloric sweeteners that can optionally be incorporated into these beverages, alone, or in combination with carbohydrate sweeteners, include, for example, saccharin, cyclamates, acetosulfam, L-aspartyl-L-phenylanaine lower alkyl ester sweeteners (e.g., aspartame), L-aspartyl-D-alanine amides disclosed in U.S. Pat. No. 4,411,925 (Brennan et al), L-aspartyl-D-serine amides disclosed in U.S. Pat. No. 4,399,163 (Brennan et al), L-aspartyl-L-1-hydroxymethyl-alkaneamide sweeteners disclosed in U.S. Pat. No. 4,338,346 (Brand), L-aspartyl-1-hydroxyethylakaneamide sweeteners disclosed in U.S. Pat. No. 4,423,029 (Rizzi), L-aspartyl-D-phenylglycine ester and amide sweeteners disclosed in European Patent Application 168,112 (Janusz), published Jan. 15, 1986, and the like. A particularly preferred noncaloric sweetener is aspartame.

I. Other Optional Beverage Ingredients The beverages of the present invention can comprise other optional beverage ingredients, including other preservatives (e.g., organic acids), colorants and so forth. These beverages can also be fortified with from 0 to about 110% of the U.S. Recommended Daily Allowance (RDA) of vitamins and minerals, provided that such vitamins and minerals do not substantially alter the desired properties of the beverage (e.g., ambient display times), and that such vitamins and minerals are chemically and physically compatible with the other essential components of beverage. Especially preferred are vitamin A (e.g., vitamin A palmitate), provitamins thereof (e.g., β-carotene), vitamin B1 (e.g., thiamin HCl) and vitamin C (i.e., ascorbic acid), although it is understood that other vitamins and minerals can also be used.

It is well known that certain food grade polyphosphates, such as the polyphosphates described herein, can help inhibit inactivation of the ascorbic acid while in the beverage. It is also important to note that calcium, iron and magnesium fortification should be avoided since these polyvalent cations can bind to and inactive the polyphosphate.

J. Preparation

The beverages of the present invention can be prepared by conventional methods for formulating noncarbonated beverages. Such conventional methods can include hot packing or aseptic packaging operations, although such operations are not necessary for achieving either beverage stability or extended ambient display times, as described above.

Methods for making dilute juice beverages, for example, are described in U.S. Pat. No. 4,737,375 (Nakel et al), issued Apr. 12, 1988, which is incorporated herein by reference. Methods for making beverage products are also described by Woodroof and Phillips, *Beverages: Carbonated & Noncarbonated*, AVI Publishing Co. (rev. ed. 1981); and by Thorner and Herzberg, *Non-alcoholic Food Service Beverage Handbook*, AVI Publishing Co. (2nd ed. 1978).

One method for preparing the dilute juice beverages herein involves making a beverage concentrate, adding it to a sugar syrup containing the antimicrobial polyphosphate and xanthan gum (with or without other thickeners), and then trimming the mixture with water, sugar syrup, and beverage concentrate to obtain the requisite acidity and material composition. All added water used in such a preparation must have, or be adjusted to, the requisite hardness and, preferably adjusted to the requisite alkalinity levels. In such a method, the beverage concentrate can be prepared by admixing to water (correct alkalinity and hardness) an acidulant (e.g., citric acid), water soluble vitamins, flavorants including juice concentrate, and preservative. An oil-in-water emulsion can then be added to the concentrate. The sugar syrup for use in preparing the beverage is separately prepared by adding the polyphosphate and thickening agents (including xanthan gum) to water, then adding ascorbic acid and polyphosphate to water, combining these two mixtures with additional water, and then adding sugar syrup (e.g., high fructose corn syrup) to the mixture. Additional preservative can be added to the resulting sugar syrup. The sugar syrup and concentrate are combined to form the beverage. The beverage can be trimmed with small amounts of added water, sugar syrup and beverage concentrate to achieve the requisite acidity and composition of the beverage of the present invention. It can then be pasteurized, packaged and stored.

K. Test Method: Ambient Display Times

Ambient display times correspond to the time period during which a noncarbonated beverage product at 68° F. (20° C.) can effectively resist microbial proliferation following a 10 cfu/ml inoculation with beverage spoilage microorganisms. The term "microbial proliferation" as used herein means a 100 fold increase or greater in the number of beverage spoilage microorganisms in a beverage after an initial inoculation level of about 10 cfu/ml.

Ambient display times for beverages can be determined by the following method. Beverages are inoculated with mixed groups of preservative resistant yeast containing at least four separate yeast isolates, including *Zygosaccharomyces bailii*, and with mixed groups of preservative resistant, acid tolerant bacteria, including Acetobacter species. All yeast and bacteria utilized in the inoculation are previously isolated from preserved fruit juice beverages. Inoculated beverage products are maintained at 68° F. (20° C.) for 21 days and aerobic plate cultures performed periodically. Aerobic plate counts of both yeast and bacteria populations are performed as described in the Compendium of Methods for the Microbiological Examinations of Foods, American Public Health Association, Washington, D.C. (edited by C. Vanderzant and D. F. Splittstoesser), which description is incorporated herein by reference. These plate counts are then used to identify the degree of microbial proliferation in the inoculated beverage.

EXAMPLES

The following includes specific embodiments of the dilute juice beverages, and processes for preparing them, according to the present invention.

Example I

A cloud emulsion is prepared using the following ingredient formulation:

| Ingredient | % |
| --- | --- |
| Distilled Water | 84.9 |
| Octenyl Succinate Modified Starch | 7.0 |
| Clouding Agent (cottonseed oil) | 7.0 |
| Vitamin C (ascorbic acid) | 0.05 |
| Artificial Colors | 0.05 |
| Citric acid | 0.75 |
| Potassium sorbate | 0.25 |

The above ingredients are mixed together in the order indicated and homogenized using a Model 110T Microfluidizer (Microfluidics Corp., Newton, Mass.) in a manner that produces a cloud emulsion having an average particle size less than 1 μm in diameter.

A beverage concentrate is then prepared using this cloud emulsion and the following ingredients:

| Ingredient | % |
| --- | --- |
| Distilled Water | 56.648 |
| Citric acid | 7.75 |
| Sodium citrate | 1.4 |
| Vitamin B1 (thiamine HCl) | 0.002 |
| Fruit Juice Concentrate | 13.0 |
| Cloud Emulsion | 21.0 |
| Natural Flavoring | 0.2 |

The above ingredients are mixed together in the order indicated. A thickener premix is then prepared by thoroughly dispersing xanthan gum (Kelco Keltrol F) and carboxymethylcellulose (Hercules CMC 7HOCF) in distilled water preheated to 100° F. at a ratio of xanthan to CMC to water of 0.1:0.5:200. Another premix is then prepared by dispersing ascorbic acid and sodium hexametaphosphate (SHMP) of average chain length 13 (Monsanto Co., St. Louis, Mo.) in distilled water preheated to 100° F. (37.8° C.) at a ratio of acid to SHMP to water of 0.3:1:587.2. The thickener and SHMP premixes are then combined at a ratio of 200.6:588.5 to provide a combined thickener/SHMP mixture.

The beverage concentrate and thickener/acid/SHMP mixture are then combined with the following ingredients in the order indicated to provided a finished dilute juice beverage that is stable against flocculation or significant ringing, even if stored under ambient conditions prior to consumption:

| Ingredient | % |
| --- | --- |
| Thickener/Acid/SHMP Mixture | 78.91 |
| Vitamin C (ascorbic acid) | 0.04 |
| Sweetener (high fructose corn syrup) | 13.0 |
| Beverage Concentrate | 8.0 |
| Potassium Sorbate | 0.05 |

Example II

A cloud emulsion and beverage concentrate are prepared in the same manner as described in Example I. A thickener premix is then prepared by thoroughly dispersing xanthan gum (Kelco Keltrol F) and gellan gum (Kelco Kelcogel) in distilled water preheated to 100° F. at a ratio of xanthan to gellan to water of 0.1:0.1:200. Another premix is then prepared by dispersing ascorbic acid and sodium hexametaphosphate (SHMP) of average chain length 13 (Monsanto Co., St. Louis, Mo.) in distilled water preheated to 100° F. (37.8° C.) at a ratio of acid to SHMP to water of 0.3:1:587.6. The thickener and SHMP premixes are then combined at a ratio of 200.2:588.9 to provide a combined thickener/SHMP mixture.

The beverage concentrate and thickener/acid/SHMP mixture are then combined with the following ingredients in the order indicated and refrigerated overnight to provide a finished dilute juice beverage that is stable against flocculation or significant ringing, even if stored under ambient conditions prior to consumption:

| Ingredient | % |
| --- | --- |
| Thickener/Acid/SHMP Mixture | 78.91 |
| Vitamin C (ascorbic acid) | 0.04 |

| Ingredient | % |
| --- | --- |
| Sweetener (high fructose corn syrup) | 13.0 |
| Beverage Concentrate | 8.0 |
| Potassium Sorbate | 0.05 |

Example III

A sufficient quantity of the dilute juice beverage described in Example II. is prepared and then passed through a commercial high temperature short time (HTST) pasteurization unit (instead of being refrigerated). In the HTST unit, the beverage is heated to a sterilizing temperature for a few seconds, then cooled to or below 60° F. (15.6° C.). The pasteurized beverage can be bottled and stored without further cooling and will develop appropriate thickness overnight, even when kept at elevated temperature (above ambient, but below 190° F. (87.8° C.)).

What is claimed is:

1. A method of forming a beverage, the method comprising the steps of mixing:
    (a) from about 0.2 to about 5% of an oil-in-water beverage emulsion selected from flavor emulsions and cloud emulsions;
    (b) from 0 to about 40% flavor solids selected from the group consisting of fruit juice, tea solids, and mixtures thereof;
    (c) from about 0.005 to about 0.01% xanthan gum;
    (d) from the group consisting of about 100 ppm to about 1000 ppm of a preservative selected from sorbic acid, benzoic acid, alkali metal salts thereof, and mixtures thereof;
    (e) an amount of water soluble polyphosphate effective to enhance the antimicrobial potency of said preservative; and
    (f) from about 60 to about 99% by weight of water.

2. The method of claim 1 wherein the water has from 0 to about 180 ppm of hardness.

3. The method of claim 2 wherein the water has from 0 to about 60 ppm of hardness.

4. The method of claim 3 wherein the water has from 0 to about 30 ppm of hardness.

5. The method of claim 1 wherein the water has over 180 ppm of hardness.

6. The method of claim 1 wherein water soluble polyphosphate has the general formula:

$$(MPO_3)_n$$

wherein n averages from the group consisting of about 3 to about 100 and wherein each M is independently selected from sodium and potassium atoms.

7. The method of claim 6 wherein the amount of water soluble polyphosphate comprises from about 300 to about 3000 ppm of the water soluble polyphosphate.

8. The method of claim 7 wherein n averages from about 13 to about 30 and wherein each M is sodium.

9. The method of claim 8 wherein the amount of water soluble polyphosphate comprises from about 900 to about 3000 ppm of the water soluble polyphosphate, and wherein n averages from about 13 to about 21.

10. The method of claim 9 wherein the amount of the preservative comprises from about 200 to about 1000 ppm potassium sorbate.

11. The method of claim 1 wherein amount of the preservative comprises from about 100 about 750 ppm of potassium sorbate.

12. The method of claim 1 wherein the amount of the flavor solids comprises from about 1 to about 20% fruit juice.

13. The method of claim 12 wherein the amount of the flavor solids comprise from about 2 to about 10% fruit juice.

14. The method of claim 13 wherein the amount of the flavor solids comprise from about 3 to about 6% fruit juice.

15. The method of claim 1 wherein the amount of flavor solids comprise from about 0.02% to about 0.25% tea solids.

* * * * *